United States Patent
Nakayama

[15] 3,637,301
[45] Jan. 25, 1972

[54] MOTION PICTURE CAMERA FADEOUT FADE-IN MECHANISM

[72] Inventor: Yasuhiko Nakayama, Suwa, Japan
[73] Assignee: Kabushiki Kaisha Yashica, Tokyo-to, Japan
[22] Filed: Feb. 18, 1970
[21] Appl. No.: 12,212

[30] Foreign Application Priority Data
July 1, 1969 Japan..............................44/51493

[52] U.S. Cl..............................352/217, 352/91
[51] Int. Cl.......................................G03b 9/10
[58] Field of Search...........................352/217, 91, 141

[56] References Cited
UNITED STATES PATENTS

| | | | |
|---|---|---|---|
| 2,117,694 | 5/1938 | Becker | 352/217 |
| 2,065,777 | 12/1936 | Weissbrodt | 352/217 |
| 3,531,194 | 9/1970 | Roppel et al. | 352/217 X |

Primary Examiner—Donald O. Woodiel
Attorney—Stanley Wolder

[57] ABSTRACT

A motion picture camera automatic fade-in fadeout mechanisms includes a variable-exposure aperture shutter and selectively operable means for closing the aperture with the advance feed of a predetermined length of film while disabling the film takeup. Upon closure of the aperture the drive motor is automatically stopped and then selectively energized in a reverse direction to retract the advanced predetermined length of film and thereafter the motor is energized in an advance direction and the mechanism actuated to open the aperture during the advance of said predetermined length of film an normal photography is then effected. The shutter includes a pair of blades having overlapping openings and being angularly adjustable to vary the area of opening overlap. The aperture-varying mechanism includes a heart-shaped cam advanced 180° to close the the aperture, stop during film retraction and rotated 180° to open the aperture. A drive motor shorting and reversing switch responds to the position of the aperture control mechanism.

9 Claims, 11 Drawing Figures

MOTION PICTURE CAMERA FADEOUT FADE-IN MECHANISM

BACKGROUND OF THE INVENTION

The present invention relates generally to improvements in motion picture cameras and it relates more particularly to an improved automatic mechanism for producing in motion picture photography overlapping fadeout and fade-in sequences.

The use of fadeout and fade-in sequences in motion picture photography and the use of such sequences in overlapping or successive relationship are common practice in the termination and beginning of scenes as well as in interconnecting successive scenes. With conventional cameras the achievement of satisfactory fadeout and fade-in sequences and the proper overlap relationship thereof is very difficult and requires a high degree of skill. The fade-in and fadeout rates must be closely controlled with substantially predetermined rates uniformly maintained and when these sequences are overlapped for connecting successive scenes an accurate overlap relationship is necessary for optimum visual effects. Accordingly, the employment of the conventional mechanisms for producing fadeout and fade-in sequences possesses numerous drawbacks and disadvantages and leaves much to be desired.

SUMMARY OF THE INVENTION

It is a principal object of the present invention to provide an improved motion picture camera mechanism.

Another object of the present invention is to provide an improved motion picture camera exposure control mechanism.

Still another object of the present invention is to provide an improved motion picture camera mechanism for producing fadeout and fade-in sequences.

A further object of the present invention is to provide an improved motion picture camera mechanism for automatically producing overlapping fadeout and fade-in photographing sequences.

Still another object of the present invention is to provide an improved mechanism of the above nature characterized by its ruggedness, reliability, versatility and ease and convenience of use.

The above and other objects of the present invention will become apparent from a reading of the following description taken in conjunction with the accompanying drawings which illustrate a preferred embodiment thereof.

In a sense the present invention contemplates the provision in a motion picture camera including a film feed and a film takeup of a shutter having a variable-exposure aperture, means driving said shutter, and means for varying said shutter aperture with the driving of said shutter.

In the preferred mechanism the shutter includes a pair of rotatable shutter blades having overlapping openings, the blades being relatively angularly adjustable to vary the area of overlap of the shutter blades and hence the shutter exposure aperture. The angular relationship of the shutter blades is controlled by a heart-shaped cam and a follower, the cam being gear coupled to the camera motor upon initiation of a fadeout sequence to rotate a half-revolution to close the shutter aperture, and during this operation the film takeup is disabled and the film is advanced and the shutter operated, and upon closure of the shutter aperture the camera motor is deenergized and shorted. Upon release of the camera shutter release button, the motor is energized to retract the fadeout length of film without actuation of the cam. Thereafter, depression of the shutter release button and fade control button advances the film, actuates the shutter and film takeup and rotates the cam to open the shutter aperture over a period equal to the fadeout interval to produce fade-in sequence.

The improved fadeout fade-in sequence producing mechanism is reliable and rugged and uniformly accurate in its operation, is simple and convenient to use, is completely automatic and requires no skill for its operation.

BRIEF DESCRIPTION OF THE DRAWINGS

FIG. 2 is a side elevational view thereof;
FIG. 5 is a view similar to FIG. 1 with the mechanism shown at the start of a fade-in operation.

DESCRIPTION OF THE PREFERRED EMBODIMENT

Referring now to the annexed drawings in which a preferred embodiment of the present invention is illustrated by way of example, a rotary shutter 1 includes a pair of first and second superimposed blades 1a and 1b respectively and is coupled through a shutter gear 2 to a drive shaft of an electric motor 50 in a manner that blades 1a and 1b are synchronously rotated. A second blade-mounted bushing 4 slidably engages a first blade-mounted shaft 3 which projects rearwardly from first blade 1a beyond second blade 1b and is provided with an axial well. First blade adjuster or fade shaft 5 telescopes and is only longitudinally movable along the length of first blade shaft 3 and a thrust groove 6 is longitudinally formed therein. A pin 8 projecting from fade shaft 5 slideably registers with thrust groove 6 and a helical groove 7 provided in second blade bushing 4 and fade shaft 5 is rearwardly biased by a compression spring 9 disposed between first blade shaft 3 and fade shaft 5, whereby a rotating movement of the second blade bushing 4 relative to first blade shaft 3 produced by axial movement of fade shaft 5 varies the relative angular position between first blade 1a and second blade 1b. Numerical reference 10 designates a shutter cam.

A fade arm 11 includes longitudinally opposite ends 11a and 11b slidably passing through slide brackets 12a and 12b on a baseplate 12 so as to be longitudinally movable, and an upper intermediate abutment 11c integral with arm 11 and opposing the outer end of fade shaft 5. A cam follower roller 13 is mounted on fade arm 11 adjacent one end thereof so as to be normally urged against a cam surface of a heart-shaped cam plate 15 which is rotatably mounted on a pivot 14. A circular cam plate 16 formed integrally with heart-shaped cam plate 15 has a cam groove defining recess 16a located in registry with the maximum rise of heart-shaped cam plate 15. The heart-shaped cam plate 15 and circular cam plate 16 are coupled through a one-way sliding clutch mechanism 18 (shown in FIG. 2) with a fade drive gear 17. Fade drive gear 17 is integral with the driving side or section 18b opposite to the driven side 18a of one-way sliding clutch mechanism 18 which is integral with circular cam plate 16 and a bushing 19 which slidably engages pivot 14 so that a compression spring 20 disposed between a side face of gear 17 and baseplate 12 urges driving side 18b toward driven side 18a. A pinion 23 supported by a rotatably shaft 22 between baseplate 12 and a second baseplate 21 normally engages fade drive gear 17. Pinion 23 has a worm wheel 24 integral therewith and a compression spring 25 is disposed between worm wheel 24 and baseplate 12 in such a manner that rotatable shaft 22, pinion 23 and worm wheel 24 may be axially movable against the biasing force of spring 25. A drive shaft 27 of electric motor 50 is provided with a worm 26 which engages worm wheel 24 when the latter has been lowered against the biasing force of spring 25. The drive shaft 27 is provided with a further worm 28 adapted to engage an intermediate gear 30 carried by a rotatable shaft 29 which is supported between the baseplate 12 and second baseplate 21 in axially movable manner when said intermediate gear 30 has been shifted against biasing force of an extension spring 31. A gear 32 is integral with the camera film transport shaft and is arranged so as to be normally engaged with intermediate gear 30.

Figure 1:
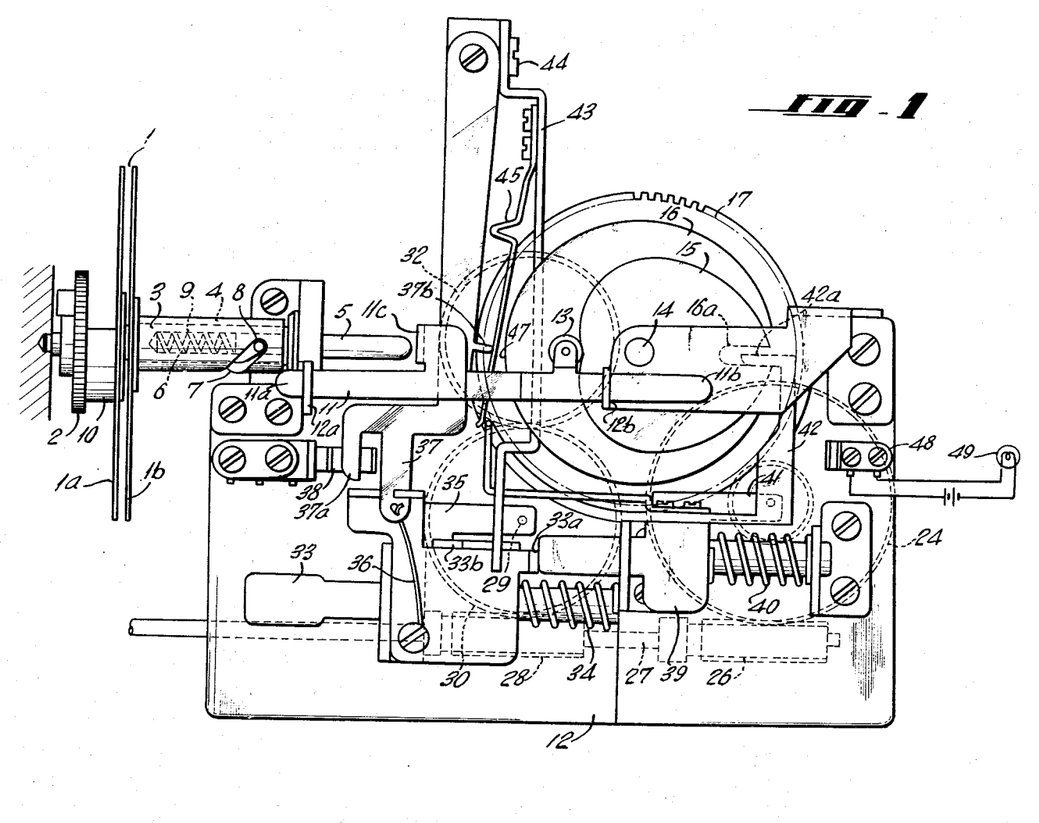
FIG. 1 is a plan view of a mechanism embodying the present invention, illustrated in a normal photographing condition.

An overlap-operating lever 33 is longitudinally slidably mounted on the baseplate 12 for side-to-side movement as viewed in FIG. 1 and is normally held by a spring 34 in the left position for normal photographing operation. A cam-defining set arm 35 formed of resilient material is mounted on the overlap operation lever 33. The set arm 35 is slanted upwardly to the right, as viewed in FIG. 2, and bears on the end of the rotatable shaft 29 of intermediate gear 30. The overlap-operating lever 33 has a suitably swingably mounted reversing switch lever 37 associated through a spring 36 therewith. An arm 37a on an end of switch lever 37 is opposed to a contact 38 of a reversing switch as will be described later and an operative projection or finger 37b provided on an intermediate portion of switch lever 37 registers with the cam surface of circular cam plate 16. A release arm 39 registering with and adapted to be urged by an end 33a of lever 33 in the range of movement of lever 33 against the biasing of the spring 34 is slidably mounted on the second baseplate 21 and biased by a compression spring 40. The release arm 39 carries a cam-defining set arm 41 of resilient material having a cam surface slanted upwardly toward the right as viewed in FIG. 2 and a lock arm 42 having an operative end 42a registering with circular cam plate 16. The end of the rotatable shaft 22 of worm wheel 24 is opposed to the slanted cam surface of set arm 41.

A swingable lock lever 43 functions to hold overlap-operating lever 33 in its depressed or advanced position against the biasing of spring 34. The lock lever 43 has an end pivotally supported by a stationary pin and a free end movable into the path of a stepped portion 33b of operating lever 33. A resilient armor piece 45 is affixed to lock lever 43 and a bent tip of a link lever 46 projecting from release arm 39 is interposed between lock lever 43 and resilient piece 45 overlaying one another. An intermediate portion of lock lever 43 is opposed to a pin 47 projecting from a ring 47a which, in turn, loosely engages the bushing 19 of fade drive gear 17 for axial movement and the pin 47 is so arranged to move to the lower edge of the lock lever 43 and resilient piece 45 as drive gear 17 is lowered against biasing force of its associated compression spring 20 from the position for normal photographing operation during which resilient piece 45 abuts against the end of said pin 47. A switch 48 of the normally open type is disposed within the path of lock lever 42 so that lever 42 urges switch 48 to be closed and to light a lamp 49 for indicating the overlap operation.

Figures 9, 10, 11:
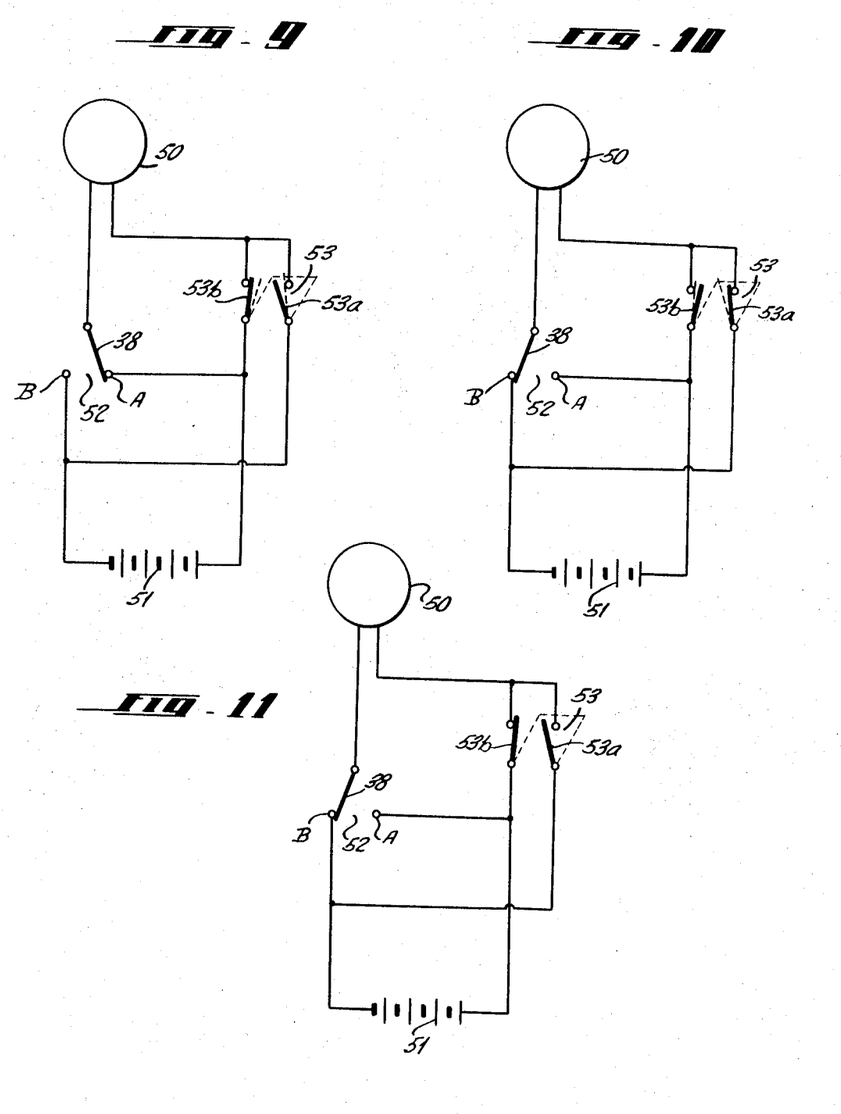
FIG. 9 is a circuit diagram of the mechanism motor control network in a normal photography state.
FIG. 10 is a view similar to FIG. 10 upon termination of a fadeout operation.
FIG. 11 is a view similar to FIG. 9 during a film reverse feed operation.

The mechanism electrical circuit is illustrated in FIG. 9 to 11, and includes electric motor 50 for driving the operating mechanism, a battery 51 functioning as a power source and a changeover circuit for control of forward and reverse motor rotation. More specifically, a forward rotation drive circuit comprises the positive electrode of the battery 51 connected through the terminal A of reversing switch 52 and arm 30 thereof to one input electrode of the motor 50, and the negative electrode of battery 51 connected through the closed circuit of switch section 53a of an oppositely closed two-armed switch 53 to the other input electrode of motor 50; and a reverse rotation drive circuit is effected upon the closure of the B terminal of reversing switch 52 by arm 38 and the closing of switch section 53b. When the motor forward and reverse rotation drive circuit is opened, the input electrodes of motor 50 is short circuited through switch terminal A and switch section 53b; or switch terminal B and switch section 53a.

Considering now the operation of the camera provided with the improved mechanism, for normal photography first, a release button (not shown) associated with switch 53 is depressed to switch 53 which is normally in the position as shown by solid line in FIG. 9 to the position as shown by broken line to close and open switch sections 53a and 53b respectively. Thus, the energization circuit for forward rotation drive of the electric motor 50 is closed whereby electric motor 50 is energized. The motor drive is transmitted by the driving shaft 27 through the worm 28 to the intermediate gear 30, driving the gear 32 integral with the film transport shaft for accomplishing the film transport operation, driving the shutter gear 2 in well-known manner to rotate the rotary shutter 1 with a relative predetermined position between the first blade 1a and the second blade 1b being maintained, and effecting the film advance operation of film transport pawl (shown in FIGS. 1, 2 and 7). Photography is thus accomplished as in the conventional motion picture camera may be carried out by this operation just as usual cinecamera.

Figure 3:
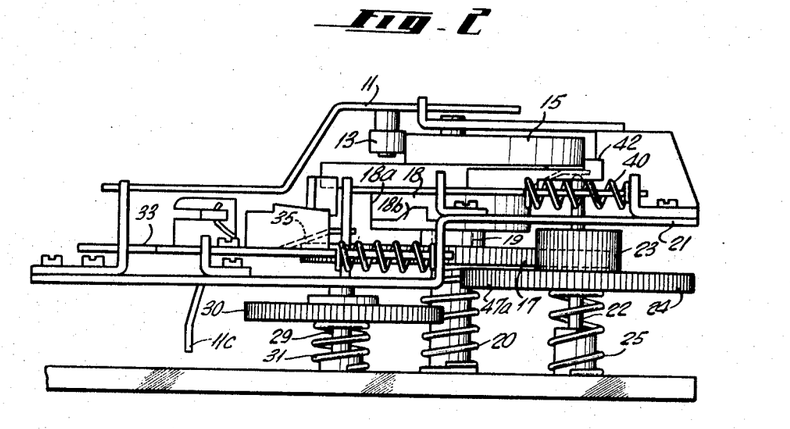
FIG. 3 is a view similar to FIG. 1 with the mechanism shown upon completion of a fadeout operation.
Figure 4:
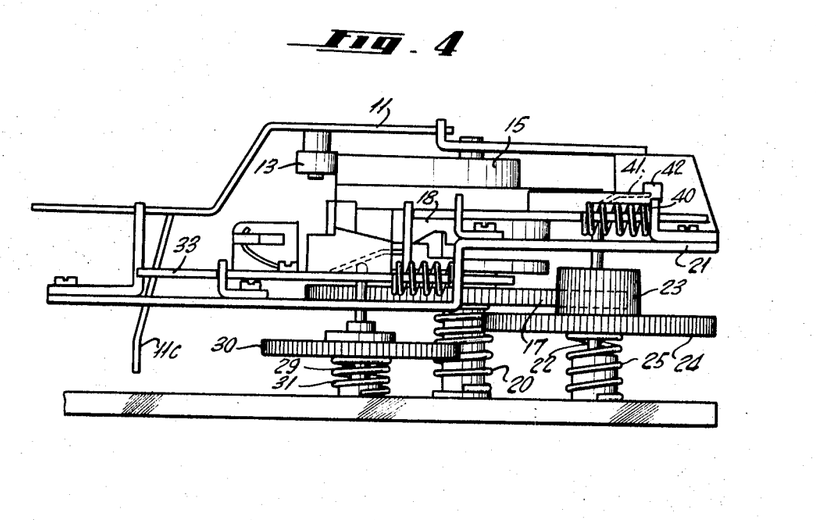
FIG. 4 is a side elevational view thereof.

For fadeout photography independently of or following normal photography, the overlap-operating lever 33 is depressed to the right as viewed in FIG. 1 against the biasing of spring 34 and the lever 33 is held in its depressed position by the free end of lock lever 43 engaging the stepped portion 33b. With this movement of overlap-operating lever 33, the set arm 35 integral therewith by its slanted surface depresses shaft 29 downward as in FIG. 2 against the biasing force of the compression spring 31. As a result, intermediate gear 30 also is lowered to the depressed position as shown in FIG. 4 and is disengaged from the worm 28. The overlap-operating lever 33 through its end 33a urges the release arm 39 to the right as viewed in FIG. 1 against the biasing force of the spring 40 (as shown in FIG. 3). The end finger 42a of the lock arm 42 integral with release arm 39 is consequently retracted from the cam groove 16a of the circular cam plate 16 and the slanted set arm 41 similarly integral with said release arm 39 urges the shaft 22 of the worm wheel 24 downwardly as in FIG. 2 against the bias of spring 25. Thus, worm wheel 24 engages the worm 26 mounted on the drive shaft 27, as shown in FIGS. 3 and 4.

The electric motor 50 being still energized after normal photography now drives the fade drive gear 17 counterclockwise through the drive shaft 27, the worm 26, the worm wheel 24 and the pinion 23 integral with worm wheel 24, as seen in FIG. 3. Drive gear 17 drives the circular cam plate 16 and the heart-shaped cam plate 15 counterclockwise through the one-way clutch mechanism 18 comprising the drive side 18b integral with drive gear 17 and the driven side 18a integral with drive gear 17 and engaging drive side 18b. As heart-shaped cam plate 15 rotates, the fade arm 11 having the roller 13 bearing against the cam surface of cam plate 15 is gradually urged to move to the left as viewed in FIG. 1. Due to this movement, the abutting piece 11c of arm 11 urges the fade shaft 5 against biasing of spring 9 to left.

As fade shaft 5 advances into the first blade shaft 3, the pin 8 on shaft 5 moves along the thrust groove 6 on said first blade shaft 3 to the left as seen in FIG. 1 so as to urge the inner wall of the spiral groove 7 on the second blade bushing 4 and, in consequence, bushing 4 rotates clockwise as viewed in FIG. 1. As a result, the first blade 1a and the second blade 1b rotate together, with their relative position gradually varying, and their overlapping area gradually increasing, thus the interblade angle between these two blades 1a and 1b and the shutter aperture gradually decreasing.

Photography is continued with the decreasing aperture or opening angle of the rotary shutter 1, but intermediate gear 30 is out of engagement with the worm 28 so as to disable the film takeup or with the result that the film transport pawl fed film is advanced into the space for film transport so as to loosen film which has been previously reeled around the film spool. When the heart-shaped cam plate 15 comes to the position in which its maximum rise engages roller 13 in the sequence described above, the rotary shutter 1 is in completely closed position since the fade shaft 5 is fully advanced by the fade arm 11.

At this point cam groove 16a of circular cam plate 16 rotating with heart-shaped cam plate 15 registers with the intermediate operative projection 37b of the reversing switch lever 37. Accordingly, depressed overlap operating lever 33 swings reversing switch lever 37 counterclockwise as seen in FIG. 1, since projection 37b engages cam groove 16a of circular cam plate 16 under the biasing of the spring 36 disposed between reversing switch lever 37 and overlap operating lever 33. The arm 37a on and end of switch lever 37 engages the contact 38 of reversing switch 52 so as to switch contact 38 from the position of terminal A as in FIG. 9 to the position of terminal B as in FIG. 10. The forward rotation drive-energizing circuit for the electric motor 50 is interrupted and the camera release button being depressed so that switch sections 53a and 53b are closed and open respectively, as shown in FIG. 10, the input terminals of the electric motor 50 are short circuited, suddenly stopping and braking electric motor 50.

The fadeout sequence is completed with the above operation. The operator releases the camera release button upon completion of the fadeout sequence whereupon the release switch 53 returns from the position shown by solid line in FIG. 10 to the position shown in FIG. 11. The reverse rotation drive energizing circuit for the electric motor 50 is thus completed and electric motor 50 is rotated in the direction reverse to that during normal photography, so that electric motor 50 drives the worm wheel 24 through the worm 26 clockwise as in FIG. 3 and drives the fade drive gear 17 also clockwise. The heart-shaped cam plate 15 and the circular cam plate 16 are prevented from rotating since the intermediate operative projection 37b of reversing switch lever 37 engages the cam groove 16a in circular cam plate 16. Rotation of drive gear 17 is permitted by reason of the slip of the one-way sliding clutch mechanism 18 disposed between gear 17 and the circular cam plate 16 so that the drive side 18b thereof only may be rotated. Engaging cam surfaces disposed along the abutting surfaces between the drive side 18b and driven side 18a urge said drive side 18b and the drive gear 17 downward to the position shown in FIG. 4 against the biasing force of spring 20 as drive side 18b rotates. As drive gear 17 is thus lowered, the pin 47 on ring 47a is lowered to the position corresponding to the lower edge of the resilient piece 45 mounted on lock lever 43 (as shown in FIG. 4). The film transport pawl is reversely driven by electric motor 50 during this process so as to retract film already reeled around the film spool in the previous sequence. The circular cam plate 16 and the heart-shaped cam plate 15 are not rotated during this film return operation, so that the rotary shutter 1 under control of heart-shaped cam plate 15 operates with a completely closed aperture or shutter opening angle just as at the termination of the fadeout sequence and the film is returned with the exposed condition of the previous fadeout photography.

Figure 6:
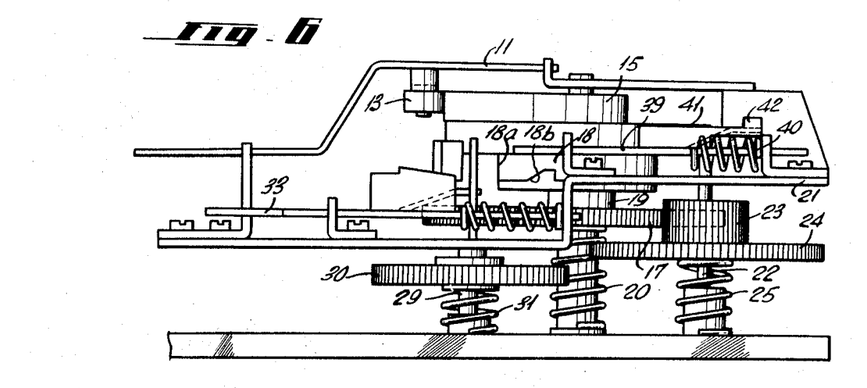
FIG. 6 is a side elevational view thereof.

As the film return operation effects one reverse rotation of fade drive gear 17, drive section 18b of sliding clutch mechanism 18 integral with drive gear 17 reengages the driven section 18a, the clutch sections assuming their relative positions before the film return operation. The driven section 18a and drive section 18b, therefore, bear against each other under biasing force of spring 20. The pin 47 mounted on the bushing 19 abuts against lower edge of the resilient piece 45 of the lock lever 43 and lifts resilient arm 45 when drive side 18b returns to its upper position, so that lock lever 43 swings back to the position shown by solid line in FIG. 7. Upon such restoration of lock lever 43, the overlap operating lever 33 is disengaged from the stepped portion 33b and is returned to its left hand position as in FIG. 3. The returning overlap operating lever 33 urges the link portion of spring 36 to the left and thereby swings reversing switch lever 37 to the left. The reversing switch 52 is, therefore, changed over from the position as shown in FIG. 11 to the position as shown in FIG. 9. The electric motor 50 is thus deenergized and its input terminals short circuited since the camera release button is retracted as is switch 53 to thereby brake electric motor 50. The film return operation after the fadeout sequence is completed with the above operation, as shown in FIGS. 5, 6 and 9.

The shutter button is then again depressed after completion of the film return operation so as to close the release switch 53 to the position shown by broken line in FIG. 9 to thereby energize the electric motor 50 which again rotates forwardly. At this point the retracted overlap-operating lever 33 releases intermediate gear 30 on rotating shaft 29 so that intermediate gear 30 again engages worm 28, while the release arm 39 is prevented from returning by the finger 42a of the lock arm 42 bearing on the circumferential surface of the circular cam plate 16. Accordingly, the engaged sliding clutch mechanism 18 and the engaged worm 26 and worm wheel 24 provides a motor drive for cam plates 15 and 16. Additionally, the return of reversing switch lever 37 retracts intermediate operative projection 37b from cam groove 16a of circular cam plate 16, so that film is taken up by the film spool just as in normal photography and heart-shaped cam plate 15 and circular cam plate 16 again rotate counterclockwise as in FIG. 5.

Normal operation of the film transport is accomplished with the operation described above and the opening angle between the first blade 1a and the second blade 1b of rotary shutter 1 increases from the aperture completely closed position as the fade arm 11, which has been urged at its longest eccentric position due to rotation of the heart-shaped cam plate 15, is moved to the right as in FIG. 5. The fadeout section of film is once returned and fade-in photography with said interblades 1a and 1b opening angle increasing is overlapped on said fadeout film section.

Figure 7:
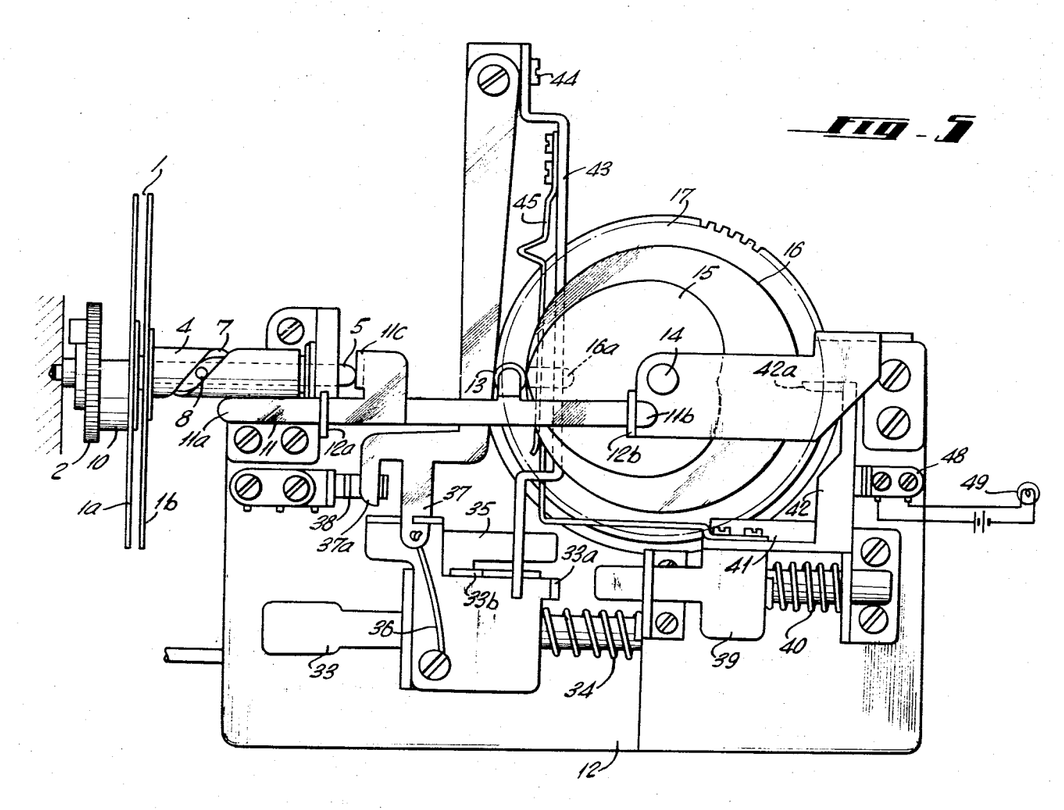
FIG. 7 is a side elevational view of the film drive motor switch control section.
Figure 8:
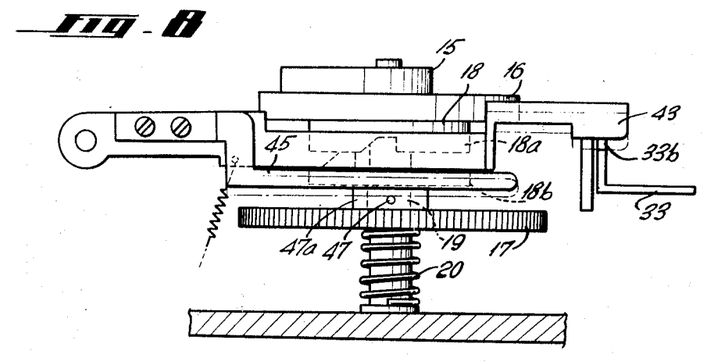
FIG. 8 is a view similar to FIG. 7 during the motor reverse drive.

The fade-in photography is continued until the heart-shaped cam plate 15 and the circular cam plate 16 move from the positions as shown in FIG. 5 to the initial positions as shown in FIG. 1. Both cam plates 15 and 16 which have rotated one-half revolution during the fadeout sequence now rotate the remaining half revolution during the fade-in photography so that fade arm 11 under control of heart-shaped cam plate 15 is restored to the initial position as shown in FIG. 1 and when the opening angle between the first blade 1a and the second blade 1b is completely opened as predetermined for normal photography, finger 42a of the release arm 39 engages cam groove 16a of the circular cam plate 16 so that release arm 39 is moved by spring 40 to the left as in FIG. 5. As a result, shaft 22 which is released by set arm 41 is now lifted by spring 25 and worm wheel 24 withdraws from engagement with the worm 26 so that the drive-transmitting system for the heart-shaped cam plate 15 and the circular cam plate 16 may be continued. Upon retraction of release arm 39, the link lever 46 mounted on arm 39 urges the resilient piece 45 of the lock lever 43 to the left as in FIG. 5. Accordingly, resilient piece 45 rides over the pin 47 which has been urged against lower edge thereof to the normal position as shown in FIG. 7.

The fadeout sequence film return and the overlapping of the fadeout film section by a fade-in sequence are completed with the operation described above and normal photography is continued by maintaining the shutter button depressed.

The release arm 39 is held by the circular cam plate 16 in its right-hand position as in FIG. 3 against the bias force of the spring 40, so that the lamp 49 controlled by the normally open switch 48 which is closed by the movement of the lock arm 42 to right hand as in FIG. 3, is lit to indicate the interval of overlap photography.

As described above, the present invention provides a system comprising a rotary shutter mechanism having an adjustable shutter opening angle, a mechanism adapted to vary said opening angle according to the photographing operation, and a mechanism adapted to selectively couple said mechanism for varying said opening angle to a drive mechanism, by which the amount of film exposure is decreased or increased whereby fadeout and fade-in photography is accomplished and such a decrease or increase of said amount of film exposure is carried out by the mechanism for varying the opening angle being coupled to said drive mechanism, so that the most effective fadeout and fade-in photography is easily accomplished at the fadeout and fade-in rate adjusted by the mechanism for varying the shutter opening angle. The system of the present invention further comprises a mechanism for the interruption of the drive transmission to the film transport or takeup shaft during the fadeout sequence, and a mechanism for control of the forward rotation of the electric motor so that, during fadeout photography, film is merely forced into a film-receiving magazine instead of being reeled around the film transport spool and then film return is accomplished so that film previously forced into the magazine is pulled out by reversely driving the drive mechanism. The result is that not only may film return be accomplished smoothly but also film return after a fadeout sequence is possible even with a film magazine of the type for which film return has been usually impossible.

The operation of the present mechanism has been described as employed in overlap photography which is accomplished by the associated operation of mechanical parts in the fadeout and fade-in sequences, the overlap photography being automatically accomplished, namely, without any displacement of the film position corresponding to the fadeout and fade-in exposure so that an optimum photographic effect is obtained by a simple and easy manipulation. The mechanism of the present invention, in addition, may independently accomplish fadeout and fade-in photography respectively merely by applying a lens cover to the objective lens during the fade-in and fadeout sequences respectively. Furthermore, the fade arm 11 in the embodiment illustrated may be provided on right end thereof with a means adapted to be urged by a manual lever projecting outward from camera body whereby to vary the fadeout and fade-in rate by manual operation and to replace said lens cover.

While there has been described and illustrated a preferred embodiment of the present invention, it is apparent that numerous alterations, omissions and additions may be made without departing from the spirit thereof.

I claim:

1. In a motion picture camera including a film feed and a film takeup, a shutter having a variable-exposure aperture, means driving said shutter, means for varying said shutter aperture with the driving of said shutter, means for deactuating said film takeup for an interval during the variation of said shutter aperture from an open to a closed position, and means for rewinding the film advance during said interval with said aperture in a closed position.

2. The motion picture camera of claim 1 including a reversible drive motor coupled to said film feed and means responsive to the closing of said shutter aperture by said aperture-varying means for deactuating said drive motor.

2. The motion picture camera of claim 2 wherein a predetermined length of film is advanced by said film feed during said closing of said shutter aperture by said aperture-varying means and said film-rewinding means includes means for actuating said drive motor in a reverse direction to reverse drive said film feed whereby to retract said predetermined length of film.

4. The motion picture camera of claim 2 wherein a predetermined length of film is advanced by said film feed during said closing of said shutter aperture by said aperture-varying means and said film-rewinding means includes means for actuating said drive motor in a reverse direction to reverse drive said film feed whereby to retract said predetermined length of film and means responsive to the retraction of said predetermined length of film for deactuating said motor.

5. The motion picture camera of claim 2 wherein a predetermined length of film is advanced by said film feed during said closing of said shutter aperture by said aperture-varying means and said film-rewinding means includes means for actuating said drive motor in a reverse direction to reverse drive said film feed whereby to retract said predetermined length of film, means responsive to the retraction of said predetermined length of film for deactuating said motor, and means for actuating said aperture varying means following the retraction of said predetermined length of film to open said shutter aperture during the advance of said predetermined length of film.

6. The motion picture camera of claim 1 including means for initiating the actuation of said aperture-varying means to close said aperture, means for locking said aperture-varying means in said actuation condition, and means responsive to the closing of said aperture for releasing said aperture-varying means to a deactuated position.

7. The motion picture camera of claim 1 wherein said shutter includes a pair of synchronously driven shutter blades having overlapping openings and means for adjusting the relative position of said blades to vary the overlapping areas of said openings.

8. The motion picture camera of claim 1 including indicating means responsive to the position of said aperture-varying means.

9. An automatic fadeout and fade-in mechanism in a motion picture camera comprising a shutter having an adjustable aperture, means for driving said shutter, means selectively coupled to said drive means for gradually reducing said aperture to a closed condition in a fadeout sequence with the operation of said shutter along a predetermined length of said film, means motivated by said drive means for alternatively transporting said film in a forward or a reverse direction, alternatively actuatable and deactuatable means for taking up the forwardly transported film, means responsive to the initiation of said fadeout sequence for deactuating said takeup means, means for reverse transporting said predetermined length of film with said shutter aperture in a closed condition, and means for gradually increasing said aperture from its closed to its open condition in a fade-in sequence along said predetermined film length with the operation of said shutter and the forward transport of said predetermined length of film.

* * * * *